Figure 1:
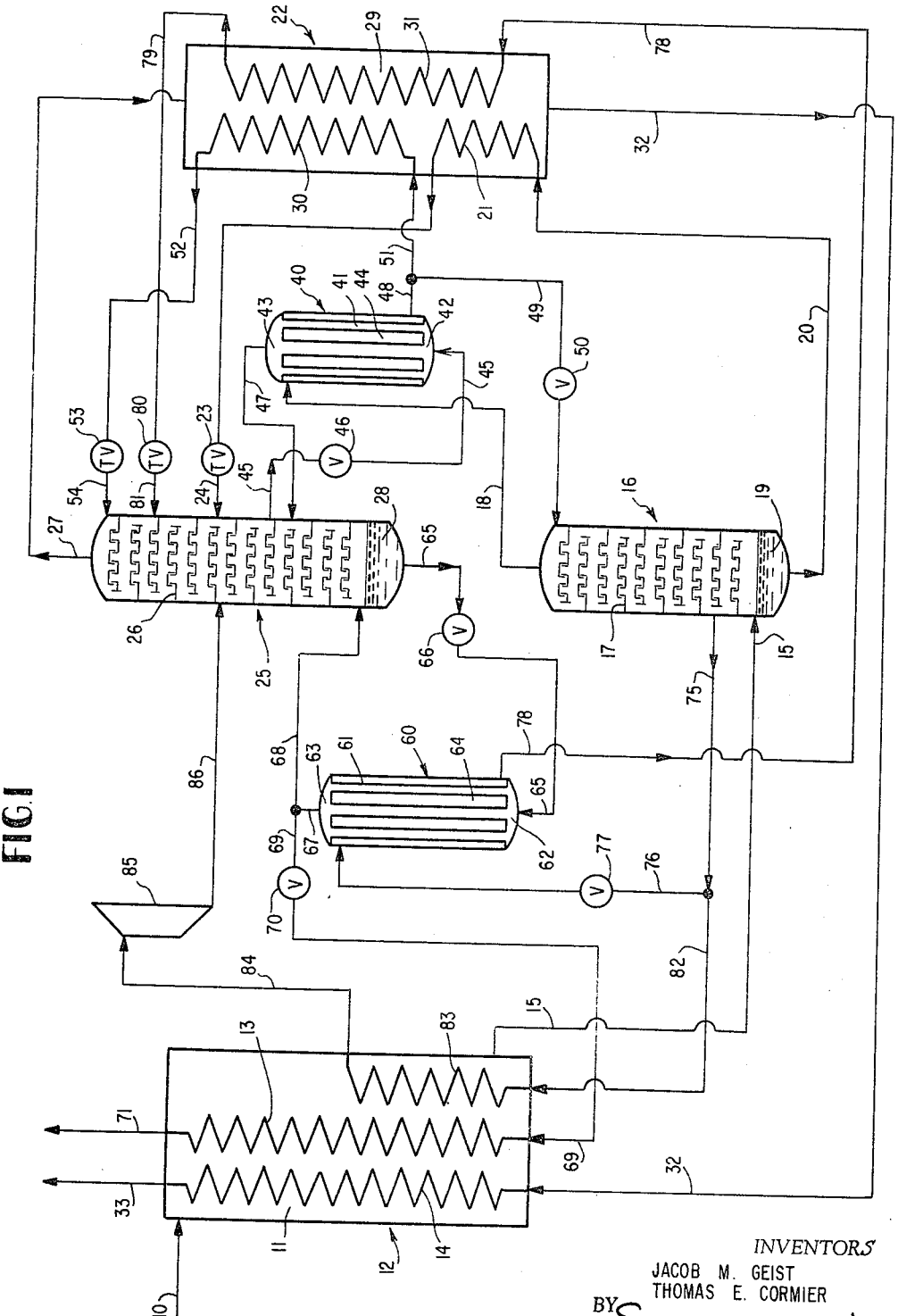

Oct. 11, 1966 J. M. GEIST ETAL 3,277,655
SEPARATION OF GASEOUS MIXTURES
Filed Aug. 19, 1963 2 Sheets-Sheet 1

INVENTORS
JACOB M. GEIST
THOMAS E. CORMIER
BY Shanley & O'Neil
ATTORNEYS

Oct. 11, 1966   J. M. GEIST ETAL   3,277,655
SEPARATION OF GASEOUS MIXTURES
Filed Aug. 19, 1963   2 Sheets-Sheet 2

INVENTORS
JACOB M. GEIST
THOMAS E. CORMIER
BY
Shanley & O'Neil
ATTORNEYS

United States Patent Office 3,277,655
Patented Oct. 11, 1966

3,277,655
SEPARATION OF GASEOUS MIXTURES
Jacob M. Geist and Thomas E. Cormier, Allentown, Pa., assignors to Air Products and Chemicals, Inc., a corporation of Delaware
Filed Aug. 19, 1963, Ser. No. 302,957
7 Claims. (Cl. 62—29)

This invention relates to the separation of gaseous mixtures and particularly to methods of fractionating gaseous mixtures under low temperature.

The power required to effect the separation of gaseous mixtures includes the thermodynamic work of separation and an energy loss represented by the irreversibility of the process required for the separation such as the compression and fractionation processes. The irreversibility of the compression process constitutes a major portion of such energy loss while the irreversibility of the fractionating process comprises more than 50% of the energy loss due to the irreversibility of the low temperature process. The provision of a fractionating process which operates in a more reversible manner would not only reduce energy losses due to irreversibility of the low temperature fractionating process but would decrease the required work of compression and thereby substantially reduce energy losses due to the irreversibility of the compression process.

The desirability of decreasing the irreversibility of the fractionating process has been appreciated in the past and theoretical studies have been made on ideal reversible columns operated under hypothetical situations. Also, low temperature fractionating cycles have been proposed in which there is simultaneous heat and mass transfer between fractionating zones under different pressures with a view toward reducing the irreversibility of the fractionating process. In order to obtain this simultaneous transfer of heat and mass, the proposed cycles require unique and structurally complicated apparatus to form the fractionating columns. It is not known that such unique fractionating columns have been constructed and operated and there is a question with respect to their practicability and reliability. In any event, the complexity of the unique structures would present serious manufacturing problems requiring a substantial capital investment as compared with conventional column structures, as well as maintenance problems, and the advantages gained by reduced power requirements would be materially nullified.

It is an object of the present invention to provide a novel method of separation of gaseous mixtures which reduces the irreversibility of the fractionating process without employing structurally complicated apparatus but by the novel use of well known components presently employed in conventional low temperature separation cycles.

Conventional two-stage cycles such as employed for the separation of air into oxygen and nitrogen components include first and second fractionating zones operating under different pressures. In such cycles, one fractionating zone operates under superatmospheric pressure, substantially corresponding to the pressure of the air feed when the components are delivered in gaseous phase, and the second fractionating zone operates at a lower pressure several pounds in excess of atmospheric pressure to insure flow from the cycle of product gases. The air feed undergoes preliminary separation in the fractionating zone under high pressure producing a liquid fraction consisting of crude oxygen and a gaseous fraction comprising substantially pure nitrogen and the crude oxygen is fed to the low pressure fractionating zone where the separation is completed producing liquid oxygen component collected in a base of the low pressure fractionating zone and gaseous nitrogen component withdrawn from the top of the zone. The liquid oxygen and the high pressure nitrogen gas are brought into heat exchange effecting relation by means of a condenser-evaporator which may form an integral part of the over-all column structure providing the fractionating zones or may comprise a two-pass heat exchange device physically located apart from the column structure except for the required piping connections. The heat interchange between the liquid oxygen and the high pressure nitrogen gas results in vaporization of liquid oxygen to provide reboil for the low pressure fractionating zone and product gas while effecting liquefaction of the high pressure nitrogen which is used as reflux for the high pressure and low pressure fractionating zones. The nitrogen gas is under high pressure relative to the liquid oxygen and the pressure differential must be sufficiently great so that the heat interchange results in the degree of reboil and reflux production required for efficient column operation while at the same time vaporizing a quantity of liquid oxygen to provide the gaseous oxygen product. The air fed to the cycle is compressed to at least the pressure existing in the high pressure fractionating zone and power requirements of the conventional two-stage fractionating cycle are determined in part by the required operating pressure of the high pressure fractionating zone established by the reboil and reflux requirements which relate to the degree of irreversibility of the fractionating process.

In a copending application of Lee S. Gaumer, Jr., Serial No. 51,847, filed August 25, 1960, now Patent No. 3,210,951 for "Method and Apparatus for Separating Gaseous Mixtures," there is disclosed an improved cycle having two stages or zones of fractionation under different pressures and including two reboilers or condenser-evaporators. Both of the reboilers are interconnected with the stages of fractionation in such a manner as to effect the required reboil and reflux production with minimum pressure differential between the two stages of fractionation and also to decrease the irreversibility of the over-all fractionating process thereby obtaining the desired separation with the high pressure fractionating zone operating under substantially reduced pressure, as compared to conventional two-stage cycles. In particular, in accordance with Gaumer Patent No. 3,210,951, reboil for the low pressure fractionating zone is obtained by establishing heat interchange between liquid component collecting in the low pressure fractionating zone and relatively high pressure gaseous material comprising components of the gaseous mixture undergoing separation with the percentage of the high boiling point component being less than the percentage of the high boiling point component of the liquid high boiling point fraction collected in the base of the high pressure fractionating zone. This heat interchange results in vaporization of a quantity of the liquid component to provide the required reboil for the low pressure fractionating zone and cooling of the gaseous material which is introduced at least into the high pressure fractionating zone. The Gaumer Patent No. 3,210,951 also provides, in combination with the foregoing heat interchange, the establishment of a second and separate heat interchange between gaseous fraction collecting in the high pressure fractionating zone and relatively low pressure liquid material including components of the gaseous mixture undergoing separation with the percentage of the high boiling point component being greater than the percentage of the high boiling point component of the liquid high boiling point fraction collected in the base of the high pressure fractionating zone. The second heat interchange effects liquefaction of the gaseous fraction to provide reflux for both the high pressure fractionating zone and the low presure fractionating zone and also effects vaporization of the liquid material which is introduced into the low pressure fractionating zone in such a manner as to decrease the irreversibility of the fractionating process occurring therein. The gaseous material may comprise cool gaseous mixture or a gas withdrawn from the high pressure fractionating zone and the liquid material may be withdrawn from the low pressure fractionating column.

The present invention comprises a novel method of separating gaseous mixtures which comprises an improvement on the invention disclosed in the Gaumer Patent No. 3,210,951 and makes it possible to improve recovery of the components with the high pressure fractionating zone operating under further reduced pressure, as compared to conventional cycles.

The foregoing and other objects and features of the present invention will be more fully understood from the following detailed description considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

Figure 2:
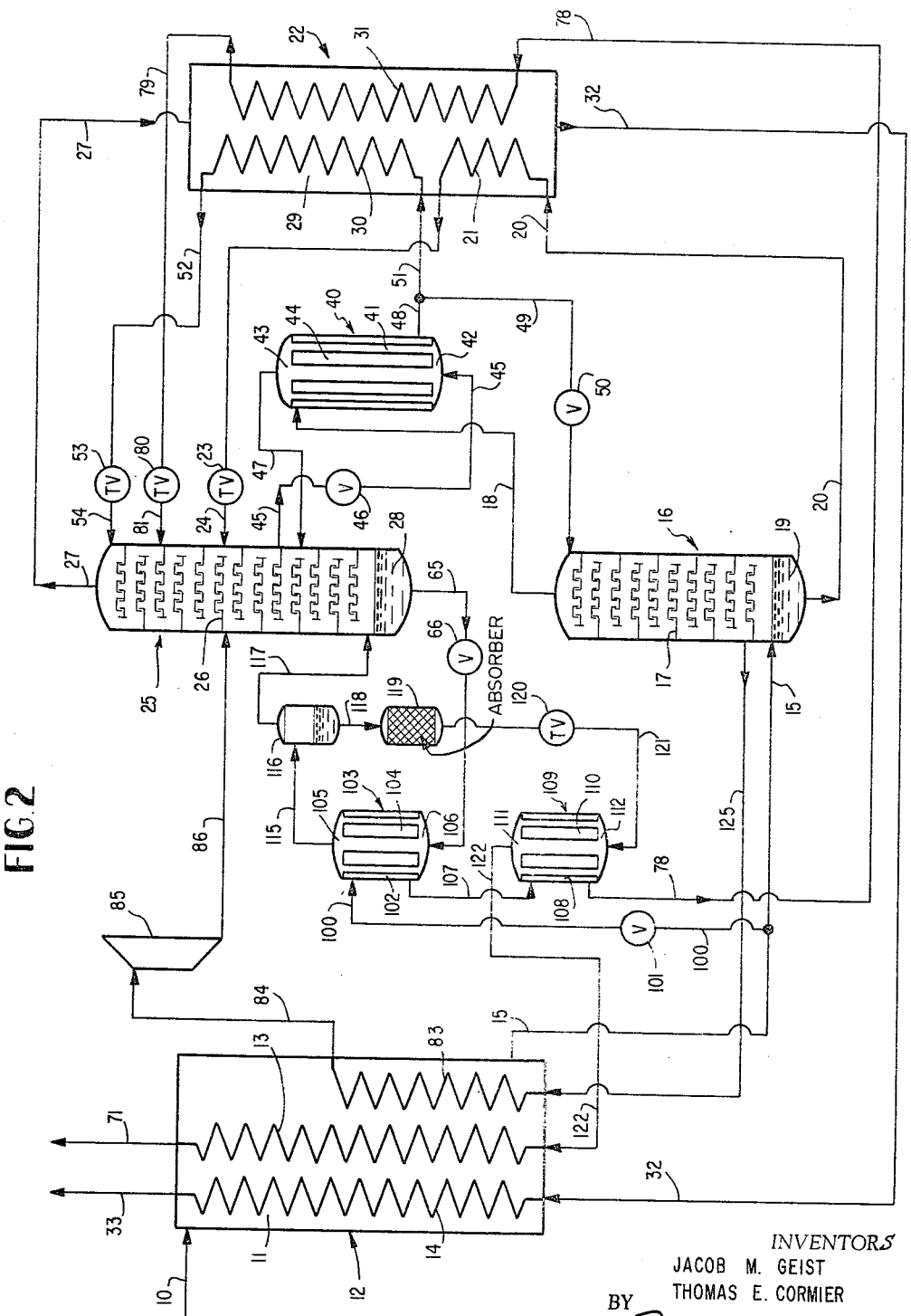

In the drawings, in which similar reference characters denote similar elements throughout the several views:

FIGURE 1 is a diagrammatic showing of a low pressure separation cycle according to one embodiment of the present invention, and FIGURE 2 is a diagrammatic showing of a low pressure separation cycle in accordance with another embodiment of the present invention.

With reference more particularly to FIGURE 1 of the drawings, a cycle embodying the principles of the present invention is disclosed therein for the separation of air into oxygen and nitrogen components. Although the present invention is disclosed and described in the environment of air separation, it is to be expressly understood that the principles of the present invention are not limited to air separation cycles but may be employed in low temperature cycles for separation of other gaseous mixtures. As shown, atmospheric air previously treated to remove moisture and carbon dioxide and compressed to a superatmospheric pressure enters the cycle through a conduit 10 for flow through the shell side 11 of a heat exchange device 12 in countercurrent heat interchange with oxygen and nitrogen components flowing through passageways 13 and 14, respectively, as described below. The compressed air is cooled upon flowing through the heat exchange device 12 and leaves the cold end of the heat exchange device at a low temperature which may approach saturation temperature at the existing pressure and is conducted by conduit 15 to a high pressure fractionating zone represented by the fractionating column 16 which may be of conventional construction including liquid-vapor contact means such as a series of fractionating plates 17 provided with bubble caps as shown. The air undergoes preliminary separation in the high pressure fractionating zone producing gaseous low boiling point fraction, that is, substantially pure nitrogen, which collects in the upper end of the column and is withdrawn therefrom through conduit 18, and liquid high boiling point fraction, that is, crude oxygen, which collects in a pool 19 in the bottom of the column. Crude liquid oxygen is withdrawn from the high pressure column by conduit 20, subcooled upon flowing through passageway 21 of heat exchange device 22 in countercurrent heat interchange with gaseous nitrogen component as described below, and then expanded in valve 23 and introduced by conduit 24 at an intermediate feed point of a low pressure fractionating zone presented by fractionating column 25 which also may be of conventional construction provided with liquid-vapor contact means such as fractionating plates 26 of the bubble cap type. In the low pressure fractionating column, the separation is continued with gaseous low boiling point component, namely, nitrogen, collecting at the upper end of the column and being withdrawn therefrom through conduit 27 and with liquid high boiling point component, namely, liquid oxygen, collecting in a pool 28 in the base of the column.

Gaseous nitrogen component is conducted by the conduit 27 for flow through the shell side 29 of the heat exchange device 22 in countercurrent heat interchange with the liquid crude oxygen flowing through the passageway 21 and in countercurrent heat exchange with fluids flowing through the passageways 30 and 31 as described below. The gaseous nitrogen component leaves the warm end of the heat exchange device 22 at a higher temperature and is conducted therefrom through conduit 32 for flow through passageway 14 of the heat exchange device 12 in countercurrent heat interchange with the incoming compressed air as described above, the nitrogen component leaving the heat exchange device 12 through conduit 33 at substantially ambient temperature.

Liquefaction of the gaseous low boiling point fraction withdrawn from the high pressure column 16 through conduit 18 is accomplished in a heat exchange device 40 wherein the gaseous low boiling point fraction is liquefied upon heat interchange with relatively cold liquid material including components of the gaseous mixture with the percentage of the high boiling point component being greater than the percentage of the high boiling point component of the liquid high boiling point fraction collecting in the base of the high pressure column 16. The heat exchange device 40 may comprise a two-stage heat exchange device of conventional construction having one pass formed by a plurality of vertically disposed tubes 41 communicating with a lower chamber 42 and an upper chamber 43, as viewed in the drawing, and with the second pass comprising shell space or a chamber 44 surrounding the tubes. Liquid material is withdrawn from the low pressure column at a level above the pool 28 and below the feed conduit 24 by a conduit 45, having a control valve 46, and conducted thereby to the lower chamber 42, and the upper chamber 43 is connected by conduit 47 to the low pressure fractionating column at a level below the conduit 45. The conduit 18 conducts the gaseous low boiling point fraction to the shell space 41 at the upper end of the heat exchange device, as viewed in the drawing, and the resulting heat interchange with the liquid material effects liquefaction of the low boiling point fraction and vaporization of the liquid material which is returned to the low pressure fractionating column as upwardly flowing vapor to decrease the irreversibility of the fractionating operation. The liquefied low boiling point fraction is withdrawn from the heat exchange device through conduit 48 and divided with one part flowing through conduit 49, provided with control valve 50, to the top of the high pressure fractionating column 16 as reflux, and a second part which is conducted by conduit 51 for subcooling in passageway 30 of the heat exchange device 22 and then passed by conduit 52 to expansion valve 53 and introduced by way of conduit 54 into the top of the low pressure fractionating column as reflux.

Vaporization of the liquid high boiling point component collecting in the pool 28 of the low pressure column, namely, liquid oxygen, to provide reboil for the low pressure fractionating column and also to provide gaseous product of the cycle is accomplished in heat exchange device 60 which may also comprise a two-pass heat exchange device of conventional construction including a plurality of tubes 61 communicating with a lower chamber 62 and an upper chamber 63, as viewed in the drawings, and a shell space 64 surrounding the tubes. Conduit 65, having a control valve 66, conducts liquid high boiling point component to the lower chamber 62. Vaporized high boiling point component collecting in the upper chamber 63 is withdrawn by conduit 67 which communicates with conduit 68 leading to the base of the low pressure column above the pool 28 and with conduit 69, having a control valve 70, leading to passageway 13 of the heat exchange device 12; the vaporized high boiling point component leaves the heat exchange device 12 through conduit 71 at substantially ambient temperature. The liquid oxygen fed to the heat exchange device 60 is vaporized upon heat interchange with gaseous material flowing through the shell space 64, the gaseous material including components of the feed mixture with the high boiling point component being less than the high boiling point component of the liquid high boiling point fraction collecting in the pool 19 of the high pressure column 16. In the embodiment of FIGURE 1, such gaseous material comprises gas withdrawn from the high pressure column 16 a few trays above the pool of liquid 19 through a conduit 75. From the conduit 75, the gaseous material is conducted by conduit 76, having a control valve 77, for flow through the shell side of the heat exchange device 60 in heat interchange with the liquid oxygen to effect vaporization of the liquid oxygen and cooling of the gaseous material; the cool gaseous material leaving the heat exchange device through conduit 78. For purposes that will be described below, the cooled gaseous material is conducted by the conduit 78 for flow through the passageway 31 of the heat exchange device 22 in countercurrent heat interchange with the cold nitrogen component, and then conducted by conduit 79 to expansion valve 80 and from the expansion valve introduced by conduit 81 into the low pressure fractionating column at a level between the feed conduit 24 and the reflux conduit 54.

Refrigeration for the cycle may be obtained by expanding a part of the gaseous material withdrawn from the high pressure column through the conduit 75. As shown, conduit 82 communicates with conduit 75 which conducts gaseous material for flow through a pre-heat passageway 83 of the heat exchange device 12 to warm the gaseous material to an optimum temperature for work expansion. The warmed gaseous material is conducted by conduit 84 to a work expansion engine 85 which may be of the turbine type, and the effluent of the work expansion engine is conducted by conduit 86 for introduction into the low pressure fractionating column at a level where the vapor within the column is of substantially similar composition.

In accordance with the principles of the present invention, the heat interchange occurring in the heat exchange device 60 between the liquid high boiling point component and the gaseous material results in complete liquefaction of the gaseous material and effects vaporization of a quantity of liquid high boiling point component to satisfy the reboil requirements of the low pressure fractionating column and provide the gaseous product of the cycle. The composition of the liquefied gaseous material corresponds to the composition of the gaseous material and thus includes a percentage of high boiling point component less than the percentage of high boiling point component of the liquid high boiling point fraction. Thus the introduction of liquefied gaseous material into the low pressure column at a level where the liquid within the column is of similar composition, which necessarily will be above the feed conduit 24 of liquid high boiling point fraction, improves the reflux ratio in the upper portion of the low pressure column which increases the separation efficiency and makes it possible to reduce the pressure of the gaseous mixture entering the cycle. In order to obtain the foregoing advantages, it is of course necessary that the gaseous material include a percentage of high boiling point component less than the percentage of high boiling point component of the liquid high boiling point fraction, and the improvement in separation efficiency will increase as the percentage of the high boiling point component decreases. In the embodiment of FIGURE 1, the gaseous material withdrawn from the high pressure column 16 through conduit 75 will be of a composition substantially the same as the composition of the feed mixture but will include a slightly greater percentage of low boiling point component due to the fractionating plates below the conduit 75. Thus the liquefied gaseous material may be introduced into the low pressure column only several fractionating plates below the top of the column and thereby improve the reflux ratio throughout a major portion of the low pressure fractionating zone above the level of the feed. Maximum increase in separation efficiency may be obtained by employing cool feed mixture leaving the heat exchange device 12 as the gaseous material, the arrangement being illustrated in FIGURE 2 of the drawings.

Inasmuch as the heat exchange device 60 effects performance of the first condensing-evaporating step and the heat exchange device 40 effects performance of the second condensing-evaporating step of the invention disclosed in the Gaumer Patent No. 3,210,951, all of the advantages obtained from the latter invention in reducing irreversibility of the fractionating process and decreasing power requirements of the cycle are obtained from the process of the FIGURE 1 embodiment while also obtaining the further power saving resulting from the improved reflux ratio discussed above.

As an operating example of the embodiment of the invention shown in FIGURE 1, 100 mols of air, previously treated to remove carbon dioxide and moisture, enters the cycle at about 62 p.s.i.a., are cooled to about −288° F. upon flowing through the heat exchange device 12 and enter the high pressure fractionating column 16 which operates at a pressure of about 58 p.s.i.a. About 25.5 mols of liquid crude oxygen at about −285° F. are withdrawn from the high pressure column, subcooled, expanded to about 21 p.s.i.a., annd then introduced into the low pressure column as feed. About 79.5 mols of gaseous nitrogen component are withdrawn from the low pressure column through conduit 27 at about −316° F., warmed to about −289° F. upon flowing through the heat exchange device 22 and leave the cycle through conduit 33 at about ambient temperature. High pressure gaseous nitrogen at about 56 p.s.i.a., comprising about 59.5 mols, is withdrawn from the high pressure column through conduit 18 and liquefied upon flow through the heat exchange device 40. The liquefied nitrogen, at about −295° F., is divided with about 32 mols being returned by way of conduit 49 to the high pressure column as reflux and about 27.5 mols being subcooled to about −312° F. in the heat exchange device 22 and then expanded in the valve 53 and introduced into the low pressure column pressure at about −312° F. The gaseous nitrogen is liquefied in heat interchange with about 52 mols of liquid mixture containing about 85% oxygen withdrawn from the low pressure column through conduit 45 at a temperature of about −298° F., the vaporized material returned to the low pressure column through conduit 47 being at about −297° F. About 32 mols of liquid oxygen at about −292.8° F. are withdrawn from the low pressure column through conduit 65 and totally vaporized in the heat exchange device 60 with about 11.5 mols of oxygen vapor being returned to the low pressure column as reboil and about 20.5 mols of oxygen vapor of about 95% purity being conducted by conduit 69 for flow through passageway 13 of the heat exchange device 12. The liquid oxygen is vaporized upon heat interchange with about 39 mols of gaseous material withdrawn from the high pressure column at about −286° F., and the totally liquefied gaseous material leaves the heat exchange device 60 at about −289° F., subcooled to about −303° F. in heat exchange device 22 and then expanded in valve 80 to the pressure existing in the low pressure column. About 8 mols of gaseous material are warmed to about −230° F. in the reheat passageway 83, expanded in the engine 85 to about 21 p.s.i.a. and thereby cooled to about −275° F.

In the embodiment of the invention shown in FIGURE 2 of the drawings, the gaseous material having a percentage of high boiling point component less than the percentage of the high boiling point component in the liquid crude oxygen is derived from the cooled gaseous mixture leaving the heat exchange device 12 and is passed in heat interchange with liquid oxygen under different pressure. As shown, a conduit 100, provided with a control valve 101, is connected to the conduit 15 and passes a portion of the cooled gaseous mixture through the shell side 102 of a heat exchange device 103 having a plurality of tubes 104 communicating with an upper chamber 105 and a lower chamber 106. The cool gaseous mixture is withdrawn from the heat exchange device 103 through conduit 107 and conducted to the shell side 108 of a heat exchange device 109 having a plurality of tubes 110 communicating with an upper space 111 and a lower space 112. The gaseous mixture is totally liquefied in the heat exchange device 109 and is conducted by conduit 78 for flow through the passageway 31 of the heat exchange device 22 and the subcooled liquid is expanded in valve 80 and introduced by conduit 81 into the low pressure column in a manner similar to the embodiment of FIGURE 1. The liquid oxygen withdrawn from the low pressure column through conduit 65 is introduced into the chamber 106 and the liquid oxygen is partly vaporized in the heat exchange device 103, partially vaporized liquefied oxygen being passed by conduit 115 and passed to a phase separator 116 from which the vaporized oxygen is withdrawn and returned by conduit 117 to the low pressure fractionating column as reboil. The unvaporized portion of the liquid oxygen is withdrawn from the phase separator through conduit 118 and passed to suitable adsorption means 119 for removing hydrocarbons or other impurities and then expanded in a valve 120 to a lower pressure just sufficient for insuring outflow of the oxygen product from the cycle. The adsorption means may be provided in duplicate so one may be onstream while the other is being purged. The expanded liquid oxygen is conducted by conduit 121 to the chamber 112 of the heat exchange device 109 wherein the liquid oxygen is completely vaporized and the vaporized oxygen is withdrawn through conduit 122 and conducted thereby for flow through the passageway 13 of the heat exchange device 12 in counter-current heat interchange with the incoming feed mixture. High pressure gas for expansion in the engine 85 may be withdrawn from the high pressure column a few trays above the pool 19 by a conduit 125 for flow through the reheat passageway 83 and on to the expansion engine 85.

The operating example for the FIGURE 1 embodiment of the invention is applicable to the embodiment of FIGURE 2 with the exception that about 40 mols of gaseous mixture are passed by conduit 100 in series through the heat exchange devices 103 and 104, the gaseous mixture entering the heat exchange device 103 at about −288° F., being cooled to about −289.2° F. upon flowing through the heat exchange device 103 and in the heat exchange device 109 being completely liquefied and cooled to about −292° F. About 32 mols of liquid oxygen enter the heat exchange device 103 wherein about 11.5 mols are vaporized and returned to the low pressure column as reflux while the unvaporized portion is expanded to about 18 p.s.i.a. in the valve 120 and completely vaporized in the heat exchange device 109, the oxygen vapor leaving the latter heat exchange device at about −293° F.

It is to be expressly understood that the gaseous material passed through the heat exchange device 60 of the embodiment of FIGURE 1 may comprise a portion of the gaseous feed mixture leaving the heat exchange device 12 as shown in FIGURE 2, and that the feature of obtaining the gaseous mixture by withdrawing gas from the high pressure column a few trays above the liquid pool 19, as shown in FIGURE 1, may be employed in the embodiment of FIGURE 2, and in both embodiments the gaseous material is derived from the feed mixture and includes a percentage of high boiling point component less than the high boiling point component in the liquid high boiling point fraction collecting in the base of the high pressure column. Furthermore, although the present invention is disclosed in the environment of air separation, it is to be expressly understood that the principles of the present invention may be employed in connection with low temperature separations of other gaseous mixtures. In addition, other arrangements for obtaining refrigeration may be employed such as expansion of gaseous low boiling point fraction withdrawn from the high pressure column 16, and switching heat exchange means may be employed to cool as well as remove carbon dioxide and moisture from the incoming feed mixture. The principles of the present invention may be employed in cycles in which high boiling point component is delivered in liquid phase; in such cycles, the quantity of liquid high boiling point component vaporized in the heat exchange device 60 or heat exchange devices 103 and 109 in excess of that required to provide reboil for the low pressure column would be equal to the high boiling point component product not withdrawn from the cycle in liquid phase. Moreover, the present invention may be employed in cycles in which a first part of the gaseous mixture is fed to the process under superatmospheric pressure corresponding to pressure existing in the high pressure column and in which a second part of the gaseous mixture is fed to the process under relatively high superatmospheric pressure such as for heat interchange with compressed liquid high boiling point component. In such cycles, gaseous material may be derived from the first part of the gaseous mixture and passed in heat interchange with liquid high boiling point component to provide reboil for the low pressure column and vaporize that portion of the high boiling point component that may be withdrawn from the cycle in gaseous phase under relatively low pressure.

It is therefore to be expressly understood that various changes and substitutions may be made in the various embodiments disclosed without departing from the spirit of the invention as well understood by those skilled in the art. Reference therefore will be had to the appended claims for a definition of the limits of the invention.

What is claimed is:
1. Method of separating gaseous mixture into component gases in a low temperature fractionating operation employing a plurality of fractionating zones in which preliminary separation takes place in a first fractionating zone under superatmospheric pressure producing gaseous low boiling point fraction and liquid high boiling point fraction and in which a further separation takes place in a second fractionating zone under relatively low pressure producing gaseous low boiling point component and liquid high boiling point component, comprising the steps of providing cold gaseous material under superatmospheric pressure from compressed gaseous mixture to be separated, the gaseous material including components of the gaseous mixture with the percentage of high boiling point component being less than the percentage of high boiling point component of the liquid high boiling point fraction and greater than the percentage of high boiling point component of the first gaseous low boiling point fraction, performing a first condensing-evaporating step including establishing heat interchange between cold gaseous material and liquid high boiling point component to vaporize the liquid high boiling point component and totally liquefy the cool gaseous material, the first condensing-evaporating step including utilization of vaporized liquid high boiling point component to provide reboil for the second frationating zone, establishing the quantity of liquid high boiling point component and of the gaseous material heat exchanged therewith in the first condensing-evaporating step to provide a quantity of vaporized liquid high boiling point component at least sufficient to satisfy the reboil requirements of the second fractionating zone, reducing the pressure of the liquefied gaseous material, introducing liquefied gaseous material under reduced pressure into the second fractionating zone, performing a second condensing-evaporating step including establishing heat interchange between gaseous low boiling point fraction and liquid material of the operation to liquefy gaseous low boiling point fraction, the liquid material being formed in a fractionating zone operating under low pressure relative to the gaseous low boiling point fraction and including components of the gaseous mixture with the percentage of high boiling point component being greater than the percentage of high boiling point component of the liquid high boiling point fraction and less than the percentage of the high boiling point component of the second liquid high boiling point fraction, and utilizing liquefied low boiling point fraction as reflux for the first and second fractionating zones.

2. Method of separating gaseous mixtures as defined in claim 1 including the step of subcooling the liquefied gaseous material prior to reducing the pressure of the liquefied gaseous material.

3. Method of separating gaseous material as defined in claim 1 including the step of passing liquefied gaseous material in heat interchange with gaseous low boiling point component prior to reducing the pressure of the liquefied gaseous material.

4. Method of separating gaseous mixtures as defined in claim 1 in which the gaseous material comprises compressed gaseous mixture cooled to a relatively low temperature by heat interchange with relatively cold components of the gaseous mixture.

5. Method of separating gaseous mixtures as defined in claim 1 in which the gaseous material is withdrawn from the first fractionating zone.

6. Method of separating gaseous mixtures as defined in claim 1 in which the quantity of vaporized high boiling point component produced in the first condensing-evaporating step is in excess of the required reboil for the second fractionating zone and including the step of passing excess vaporized high boiling point component in countercurrent heat interchange with compressed gaseous mixture to be separated.

7. Method of separating gaseous mixtures as defined in claim 4 in which the first condensing-evaporating step comprises a first heat interchange between gaseous material and liquid high boiling point component under the pressure of the second fractionating zone to provide vaporized liquid high boiling point component under the pressure of the second fractionating zone and a second heat interchange between gaseous material and liquid high boiling point component under a reduced pressure less than the pressure of the second fractionating zone to provide vaporized liquid high boiling point component under said reduced pressure, in which vaporized liquid high boiling point component under the pressure of the second fractionating zone provides reboil for the second fractionating zone, and in which vaporized liquid high boiling point component under said reduced pressure is passed in countercurrent heat interchange with the compressed gaseous mixture.

References Cited by the Examiner
UNITED STATES PATENTS

| | | | |
|---|---|---|---|
| 1,784,120 | 12/1930 | Van Nuys. | |
| 1,976,336 | 10/1934 | Eichelman. | |
| 2,360,468 | 10/1944 | Brown | 62—15 X |
| 2,513,306 | 7/1950 | Garbo | 62—29 X |
| 2,643,527 | 1/1953 | Keith | 62—29 X |
| 2,648,205 | 8/1953 | Hufnagel | 62—29 X |
| 2,655,796 | 10/1953 | Rice | 62—29 |
| 2,664,719 | 1/1954 | Rice | 62—14 |
| 2,873,583 | 2/1959 | Potts | 62—38 X |
| 3,113,854 | 11/1963 | Bernstein | 62—29 X |

NORMAN YUDKOFF, *Primary Examiner.*

V. W. PRETKA, J. C. JOHNSON, *Assistant Examiners.*